United States Patent [19]
Harnagel et al.

[11] 3,967,098
[45] June 29, 1976

[54] NAVIGATION INSTRUMENT
[76] Inventors: Gary L. Harnagel, 319 W. Cameron Ave., Pamona, Calif. 91767; Robert T. Longo, 734 Callita St., Arcadia, both of Calif. 91006
[22] Filed: Apr. 14, 1975
[21] Appl. No.: 568,162

[52] U.S. Cl................. 235/150.22; 58/152 R; 235/150.27; 235/92 TC; 340/27 NA
[51] Int. Cl.²........................................ B64D 45/04
[58] Field of Search............... 235/150.22, 150.27, 235/92 CP, 92 DP, 92 TC, 92 DN; 35/10.2, 12 N, 12 F, 12 B; 116/28, 29, 45; 340/23, 24, 27 NA; 343/112 C; 58/39.5, 74, 152 R, 152 E, 152 F

[56] References Cited
UNITED STATES PATENTS
3,577,120   5/1971   Sherbert, Jr. .................. 340/27 NA
3,589,327   6/1971   Jacobs ............................ 35/10.2
3,854,277  12/1974   Samejima et al. ............... 58/74
3,877,216   4/1975   Mounce et al. ................. 58/39.5

Primary Examiner—Malcolm A. Morrison
Assistant Examiner—Errol A. Krass
Attorney, Agent, or Firm—Bernard P. Drachlis

[57] ABSTRACT

A digital navigation instrument primarily intended for the general aviation pilot. The navigation instrument combines the functions of a calculator and a stopwatch and provides a method of easy reference to a navigation chart. The resulting unit provides ease of data entry from the navigation chart and ease of alternation between time interval measurement and arithmetic calculations.

7 Claims, 6 Drawing Figures

NAVIGATION INSTRUMENT

BACKGROUND OF THE INVENTION

Analog flight timing devices have been used in the past which mechanically measure time and cause a pointer to turn, indicating speed, distance and estimated time of arrival. Large, general purpose flight computers exist for use in large aircraft; however, the general aviation pilot cannot afford the cost or weight of the large flight computers. The usual approach for the general aviation pilot is the use of a separate stopwatch or clock with a sweep second hand in conjunction with a calculator or pencil and paper.

SUMMARY OF THE INVENTION

An electronic solid-state digital navigation instrument which combines the functions of a stopwatch and a calculator and provides a method of easy reference to a navigation chart. The resulting unit can mix calculations with time interval measurements to effect a more powerful instrument than can be had with a separate stopwatch and a separate calculator.

The instrument of this invention makes an electronic calculator behave as a stopwatch using circuitry which causes the calculator to add a 1 to the number stored in the calculator accumulator once every second. Thus the calculator is made to display time interval in seconds. Furthermore, the instrument will count up if the number in the accumulator is greater than zero and will count down if the number is less than zero. The initial time condition can be entered into the accumulator by the conventional calculator keyboard. Most importantly, since the time measurement function stores the accumulated time in the calculator, the count can be halted and the accumulated time can be operated upon arithmetically. Consequently, it is possible to alternate back and forth between time measurement and calculation as circumstances dictate.

An additional feature of the instrument is its ability to count in a special modulo 60 mode; that is, to count directly in minutes and seconds.

The keyboard layout is specifically adapted to provide a convenient method of displaying a navigation chart to be used with the counting and calculation portion of the instrument.

The invention is intended for use primarily by the general aviation pilot as a navigational instrument. It allows the common navigational problems to be solved rapidly with minimum pilot involvement. The instrument eliminates many unnecessary steps in navigational calculation by combining time measurement functions with calculation functions, freeing the pilot to concentrate on flying, navigating and communicating.

Two examples will illustrate the power of this invention. The first example employs the simple seconds counting mode and calculating mode of the instrument. The second example employs the modulo 60, minutes and seconds, counting mode.

EXAMPLE I

Determine the time required to arrive at point C by measuring the elapsed time between points A and B.

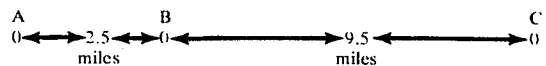

The method employing a separate stopwatch and a separate calculator is outlined as follows:
1. Start the stopwatch at point A.
2. Stop the stopwatch at point B.
3. Note the time interval and enter it into the calculator.
4. Reset the stopwatch and start it again.
5. Divide the time interval entered into the calculator by 2.5 miles.
6. Multiply the result by 9.5 miles.
7. The time required to arrive at point C is the number calculated in step No. 6 minus the time indicated by the stopwatch at any given instant.
8. Step No. 7 must be repeated each time the pilot requires time-to-arrival information.

This very simple problem takes a considerable number of steps, many of which require careful concentration. This detracts the pilot from other important functions.

The same problem is now solved employing the instrument of the present invention:
1. Press the "START" button at point A.
2. Press the "START" button again at point B.
3. Divide by 2.5 miles.
4. Multiply by −9.5 miles. The instrument is now pre-conditioned for countdown.
5. Press the "START" button again to initiate countdown.

The problem solution is complete. Since the instrument is counting down, it always displays the time remaining to reach point C. The pilot can determine time-to-go at a glance; when the device reads zero, he is at point C.

EXAMPLE II

Timing an Instrument Approach to an Airport

The Instrument Approach procedure will now be described. At a point approximately 10 miles from the airport, a radio fix designates the Final Approach Fix (FAF). From the Final Approach Fix to the airport, the pilot work load is at a maximum. As the pilot descends on the approach, he must continually adjust his rate of descent so that he will arrive at his minimum descent altitude when he reaches his missed approach point. In order to determine how well he is doing on his rate of descent, the pilot must know how much time remains in the approach. The length of time required for the approach (from FAF to minimum descent altitude) is published on the approach plates or charts for each airport and is usually given for various approach speeds. If the pilot reaches the missed approach point and he is still in the weather, he must make a missed approach. That is, he must climb to a safe altitude and fly to a predetermined point.

In the conventional method of timing instrument approaches, the pilot records the published time for the approach and starts his stopwatch at the FAF. He determines the time remaining in the approach by mentally substracting the time indicated by the stopwatch from the published time. It is difficult for most pilots to perform this operation in the approach environment where other tasks are competing for his attention.

With the navigation instrument of the present invention, the pilot enters the published time into the device before he reaches the FAF. At the FAF he starts the instrument counting down. The instrument always displays the time remaining on the approach, eliminating the necessity of any mental subtraction. When the display reads zero, the pilot is at the missed approach point. If he decides on a missed approach, he can see at a glance how much time he has spent in the missed approach since the instrument counts upward automatically after going through zero.

DESCRIPTION OF THE INVENTION

Figure 1:
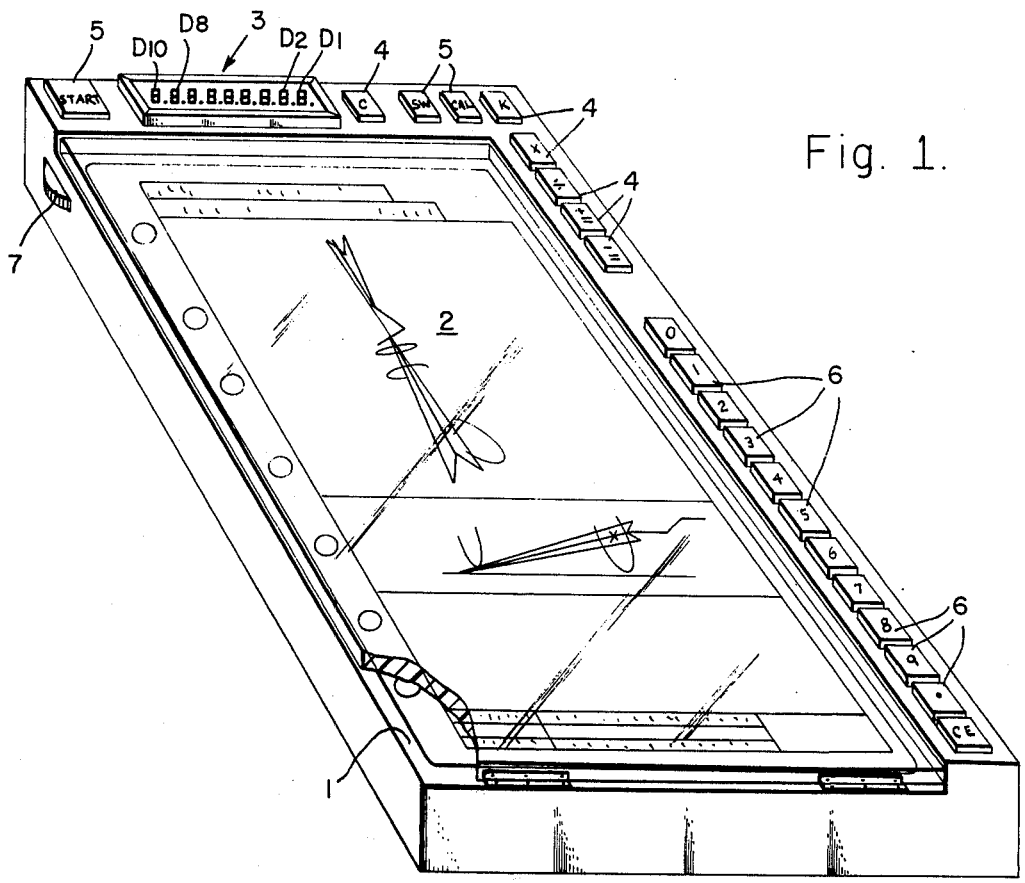
FIG. 1 is a perspective view of the navigation instrument of the present invention.

Referring now to FIG. 1, a perspective drawing of the navigation instrument of the present invention is shown. The top portion of the instrument includes a flat surface 1, on which a navigation chart may be secured. Any convenient method of securing the chart may be used such as clips, or a clear plastic cover 2. The plastic cover has the advantage that edge lighting of the plastic can provide illumination of the navigation chart. This method of illumination is described in more detail in U.S. Pat. No. 3,752,974.

A digital output display 3 is provided to display the output of the navigation instrument. Normal calculator control pushbuttons 4 are provided such as +/=, −/=, ×, ÷, clear, and constant. In addition, special control pushbuttons 5 are provided to control the counting functions of the instrument. These special control pushbuttons 5 are CAL for the normal counting mode, SW for the modulo 60 counting mode, and START for starting and stopping the counting function. Standard data entry pushbuttons 6 and an on/off switch 7 are also provided.

Figure 2:
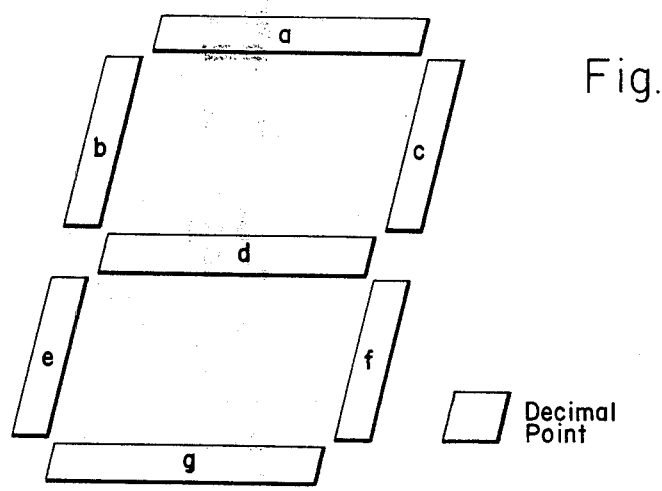
FIG. 2 is a typical display digit.
Figure 3:
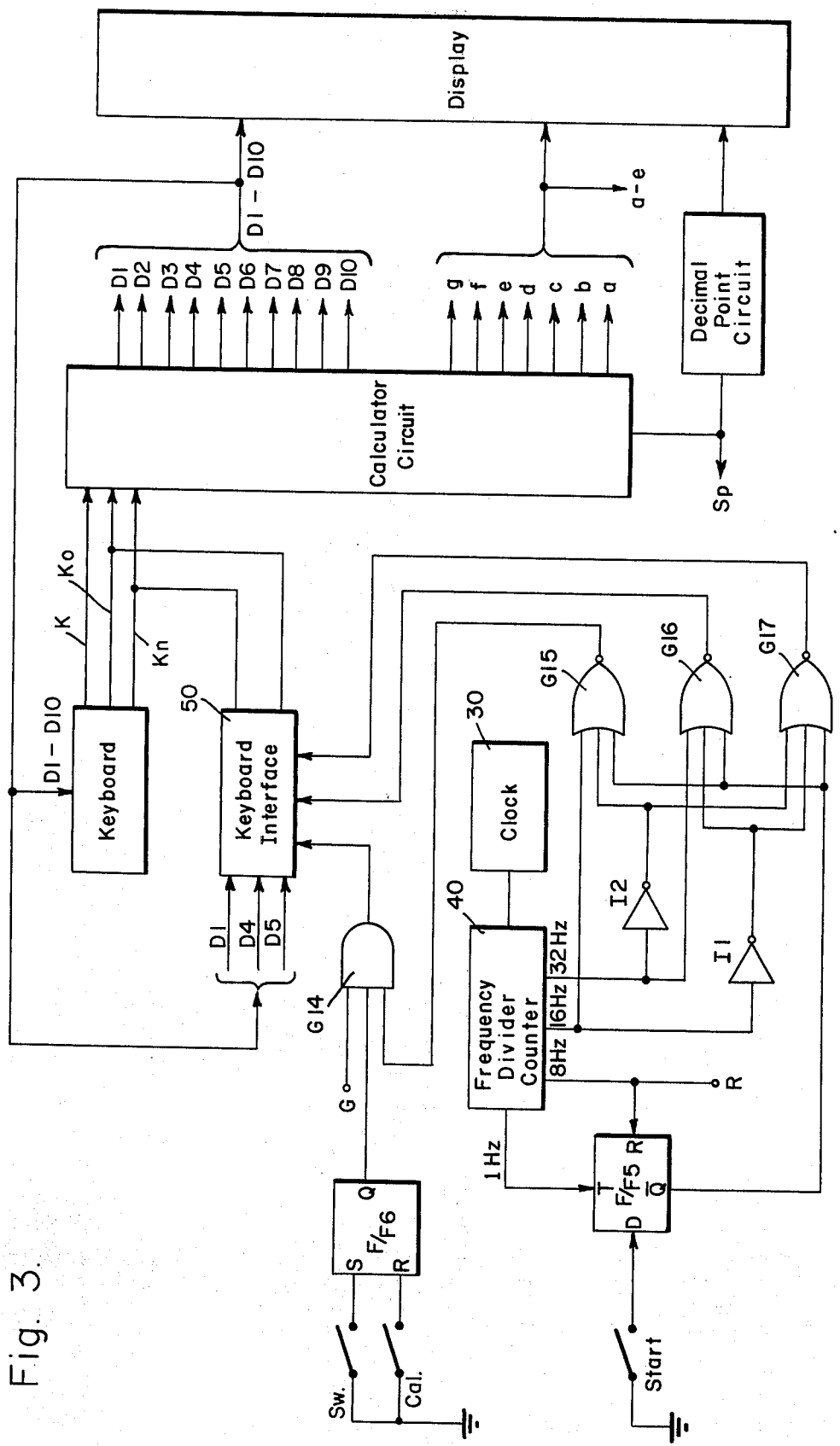
FIG. 3 is a logic diagram of the present invention.

Referring now to FIGS. 2 and 3, the basic calculator will be described. The basic calculator is formed with standard integrated circuit components that are well known in the art. The calculator circuit 10 used in the preferred embodiment of the invention employs sequential read-in of data and operating instructions, and sequential multiplexed output for each digit of the display. A typical display digit and decimal point is shown in FIG. 2. The digital output display 3 is formed from nine individual display digits providing eight numerical digits identified as D1 – D8 and a minus sign identified as D10. The display also includes a decimal point associated with each digit, identified as DP1 – DP8 and DP 10.

Each display digit is a light formed from seven individual segments $a, b, c, d, e, f, g$, as shown in FIG. 2. The display digits may be of any convenient type. In the preferred embodiment, light emitting diodes are used. The calculator circuit 10 outputs as shown in FIG. 3 are the seven segment display signals $a, b, c, d, e, f, g$ and the digit control signals D1, D2, D3, D4, D5, D6, D7, D8, D9, and D10. During each cycle of the calculator circuit 10, the digit control signals D1 through D10 are sequentially activated to gate the segment display signals $a$ through $g$ to the appropriate digit of the display. It should be noted that while the calculator circuit has provision for a 10-digit output, the preferred embodiment of the present invention uses eight numerical digits and a minus sign. At the time digit control signal D9 is activated, no display information is sent from the calculator circuit 10. The digit control signal D9 is used for keyboard entry control and for other control functions.

The calculator circuit 10 also provides a decimal point output signal SP. The decimal point output signal SP is operated on by a decimal point circuit 20 and the output of the circuit 20 is gated by the digit control signals D1 – D10 to the appropriate decimal point display DP1 – DP8.

It should be clear that the segment display signals $a$ through $g$ may change as each digit control signal D1 – D10 is activated to provide different information for each display digit. Thus the information signals to each display digit are applied in a pulsed manner rather than continuously. The sequencing cycle of the calculaor circuit 10 is sufficiently fast that the display digit lights appear to be continuously lit.

In a similar manner, the inputs to the calculator circuit 10 are applied sequentially from the keyboard during the calculator cycle. The calculator circuit 10 has three input lines, K, K$o$, K$n$. The constant function is input on line K. All numerical information is input on Line K$n$ and all control signals are input on line K$o$.

The calculator circuit 10 accepts data inputs as they are entered in the keyboard, digit by digit. The digits are identified by the time at which the K$n$ line is activated. If the K$n$ line is activated at the same time digit control signal D1 is activated, then the number being input is a 1. If the K$n$ line is activated at the same time digit control signal D2 is activated, then the number being input is a 2. So forth for digit control signals D3 – D10.

The calculator circuit 10 will continue to accept numerical inputs until an operation key is depressed. The K$o$ input line will be activated. The operation to be performed is identified by the time the K$o$ line is activated. If the K$o$ line is activated at the same time digit control signal D2 is activated, the operation is "multiply." If the K$o$ line is activated at the same time digit control signal D5 is activated the operation is "plus/equal." The remaining operations are identified with a particular digit control signal in a similar manner.

It should be understood that the particular correspondence between the operation to be performed and the digit control signals is a function of the particular calculator circuit. The description given above applies to the particular circuit used in the preferred embodiment of the invention.

Once again, it should be clear that the sequencing cycle of the calculator circuit 10 is very fast compared to the speed with which the keyboard can be operated by the human operator.

In the preferred embodiment, the keyboard has the usual keys or buttons for entering digits 0 through 9, and a decimal point, and operation instructions such as "add," "subtract," "multiply" and "divide." There is also a clear key provided to clear the calculator and a clear entry key to clear the current data input. In addition to the standard keys just described, the keyboard has special function keys associated with the counting functions of the present invention. There is a "start" key which is used to start and stop the time counting function of the instrument. There are mode keys to provide for the "Calculator" mode (seconds only) of counting and the "Stopwatch" mode (modulo 60 — minutes and seconds) of counting.

To start the time counting function of the instrument, a number is entered in the output register of the calculator circuit 10, either through direct entry from the keyboard or as a result of previous numerical calculations. The "Start" key is then depressed and 1 is added to the number in the output register of the calculator circuit 10 each second. To count up, the number initially entered in the instrument must be positive. Zero is treated as a positive number. When the counting function is initiated by pressing the "Start" key, one is added each second to increase the number displayed. To count down, the number initially entered in the instrument must be negative. When the counting function is started, one is added to the negative number thereby reducing it by one each second. When the countdown reaches zero, the counting may be stopped or it may be allowed to continue thereafter to count up. It should be understood that the calculator circuit 10 automatically adjusts for the decimal point positions of the numbers in the output register and the numbers being input. For example, if the number 23.4 is in the output register of the calculator circuit 10 and the "Start" key is pressed, one is added to the least significant whole number digit and the resulting number in the output register will be 24.4.

In the "Calculator" (seconds only) counting mode, the instrument adds one to the number in the output register of the calculator circuit 10 each second. To provide the proper timing for the counting function, a clock 30 is used. In the preferred embodiment a 16,384 Hz clock is used. However, a clock of any convenient frequency could be used. The clock output goes to a multi-stage counter 40 used as a frequency divider. The number of stages in the counter 40 is determined by the clock frequency. With the preferred embodiment frequency of 16,384 Hz, the counter will have 14 stages. Frequency divider counters are well known in the art. The counter used in the preferred embodiment is a standard integrated circuit wherein each counter stage triggers on the falling edge of the output of the previous stage.

The 1 Hz, 8 Hz, 16 Hz and 32 Hz outputs of the frequency divider counter 40 are used to provide the proper sequencing and timing of the calculator input lines. The "Start" switch from the keyboard is applied to the D-input of flip flop FF5 and acts as an enabling input for the flip flop. The 8 Hz output of the counter 40 is applied to the reset input of the flip flop FF5 and the $\overline{Q}$ output will be "1." The $\overline{Q}$ output is applied to the inputs of NOR gates G15, G16, and G17. With $\overline{Q}$ at "1," the outputs of NOR gates G15, G16, and G17 will be "0" which will inhibit activation of the calculator input lines from the counting circuitry. The 1 Hz output of the counter 40 is applied to the trigger input of the flip flop FF5 and when the 1 Hz output goes from low to high, the flip flop FF5 will be set and the $\overline{Q}$-output will be " 0," enabling the NOR gates G15, G16, and G17.

The 16 Hz output of counter 40 is applied to one input of NOR gate G15 and to inverter I1. The output of inverter I1 is applied to one input of NOR gate G16 and one input of NOR gate G17. The 32 Hz output of the couter 40 is applied to one input of NOR gate G16 and the input of inverter I2. The output of inverter I2 is applied to one input of NOR gate G15 and one input of NOR gate G17.

When $\overline{Q}$ = "0" for FF5 and when the 32 Hz output of counter 40 is high, and the 16 Hz output of counter 40 is still low, all inputs to NOR gate G15 will be "0" and the output of NOR gate G15 will be "1." The output of NOR gate G16 will be "0" because the 32 Hz output is high. The output of NOR gate G17 is "0" because the output from inverter I1 is "1." The output of NOR gate G15 is applied to one input of AND gate G14. AND gate G14 is used in the stopwatch (modulo 60) counting mode to be described in detail later.

When the 16 Hz output of counter 40 goes high and the 32 Hz output is low all inputs to NOR gate G16 will be "0" and the output of NOR gate G16 will be "1." The output of NOR gate G15 will be "0" because the 16 Hz input is high. The output of NOR gate G17 will be "0" because the input from Inverter I2 will be "1."

The output of NOR gate G16 is applied to a keyboard interface circuit 50 where it is used to activate the K$n$ input line to the calculator circuit 10 when the digit control signal D1 is activated. Thus the output of NOR gate G16 signals the entry of digit 1 into the calculator circuit 10.

Then the 16 Hz and 32 Hz outputs of counter 40 are high, all inputs of NOR gate G17 will be "0" and the output of NOR gate G17 will be "1." The output of NOR gate G15 will be "0" because the 16 Hz output of counter 40 will be high. The output of NOR gate G16 will be "0" because the 32 Hz output of counter 40 will be high.

The output of NOR gate G17 is applied to the keyboard interface circuit 50 where it is used to activate the K$o$ input line to the calculator circuit 10 when the digit control signal D5 is activated. Thus the output of NOR gate G17 signals the activation of the "plus/equal" operation to the calculator circuit 10.

The 8 Hz output of the counter 40 will go from low to high and reset flip flop FF5. Flip flop FF5 output $\overline{Q}$ will go to "1" and inhibit the outputs of NOR gates G15, G16, and G17 until the counter finishes its 1 second period and the 1 Hz output of counter 40 triggers flip flop FF5 and the cycle is repeated. This cycle will continue each second as long as the Start switch is activated.

In the Stopwatch (modulo 60) counting mode, the count is displayed in minutes and seconds. Thus, when counting up and the number 59 is reached in the seconds digits, 41 must be added to the calculator output register instead of 1 so that the seconds digits will go directly from 59 to 00. Similarly when counting down, and 00 is reached in the seconds digits., 41 must be added to the negative number in the calculator output register instead of 1 so that the seconds digits will go directly from 00 to 59.

Figure 4:
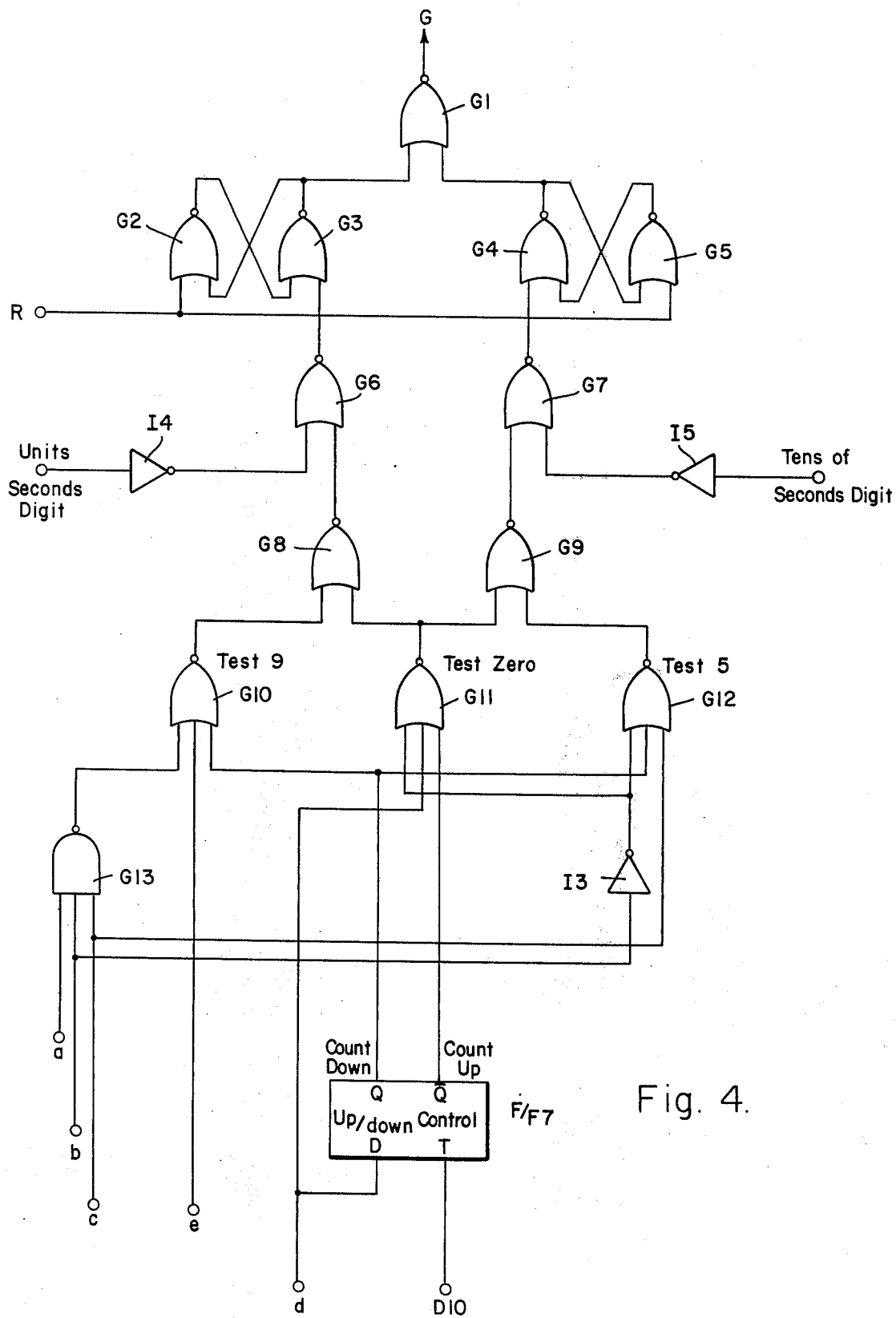
FIG. 4 is a logic diagram of the control circuit for the modulo 60 counting mode.

The control for the Stopwatch (modulo 60) counting mode is shown in FIG. 4. A control flip flop FF7 is set when a minus sign is in the calculator as indicated by digit segment $d$ being activated when digit control signal D10 is activated. When flip flop FF7 is set, it indicates that the calculator is counting down and the gating must test for 00 in the seconds digit. NOR gate G11 continually monitors digit segments $b$ and $d$. When segment $b$ is activated and segment $d$ is not activated it indicates a 0 digit. Segment $b$ is applied to inverter I3 whose output is applied to an input of NOR gate G11. The output of NOR gate G11 will be "1" when the $\overline{Q}$ output of flip flop FF7 is "0," indicating count down, and when digit segment $d$ is not activated and digit segment $b$ is activated, indicating "0" digit. The output of NOR gate G11 is applied to NOR gates G8 and G9. When the output of NOR gate G11 is "1," the outputs of both NOR gates G8 and G9 will be "0." The output of NOR gate G8 is applied to NOR gate G6. A signal indicating the units seconds digit is applied to inverter I4. The output of inverter I4 is applied to NOR gate G6. When both inputs to NOR gate G6 are "0," the output of NOR gate G6 will be "1." The output of NOR gate G6 is applied to NOR gate G3 interconnected with NOR gate G2 to act as a flip flop. The output of NOR gate G6 is "1," the output of NOR gate G3 will be "0." The output of NOR gate G3 is applied to NOR gate G1.

In a similar manner, the output of NOR gate G11 is applied through NOR gates G9 and G7 to set the flip flop made up of NOR gates G4 and G5, when the signal indicating the tens of seconds digit is applied through inverter I5. When a 0 is in the tens of seconds digit the output of NOR gate G4 will be "0." Both inputs to NOR gate G1 will be "0" and the output of NOR gate G1 will be "1," indicating that 41 should be added to the seconds count. The flip flops made up of Gates G2, G3 and G4, G5 are reset each 1 second cycle by the 8Hz output of counter 40.

The output of NOR gate G1 is applied to one input of AND gate G14. As described above, the output of gate G15 is applied to one input of AND gate G14. A third input to AND gate G14 is applied from a control flip flop FF6 which is set when the instrument is in the Stopwatch (modulo 60) counting mode. When all inputs of AND gate G14 are "1," the output is "1" and is applied to the keyboard interface circuit 50 where it is used to activate the K$n$ input line to the calculator circuit 10 when the digit control signal D4 is activated. Thus the output of AND gate G14 signals the entry of a 4 into the calculator circuit 10.

In a similar manner, in the count up mode, NAND gate G13 and NOR gate G10 test for coincidence of digit segments $a$, $b$, $c$, but not $e$, to indicate a digit 9. NOR gates G6 and G8 and G2 and G3 operate as described above to indicate a 9 in the units seconds digit.

Similarly, NOR gate G12 tests for coincidence of digit segments $b$ but not $c$ to indicate a digit 5. NOR gates G9, G7 and G4, G5 operate as described above to indicate a digit 5 in the tens of seconds digit. When both a 5 in the tens of seconds digit and a 9 in the unit seconds digit are present in the count up mode, the output of NOR gate G1 will be "1" and a 41 will be added to the count in the calculator circuit 10.

Figure 5:
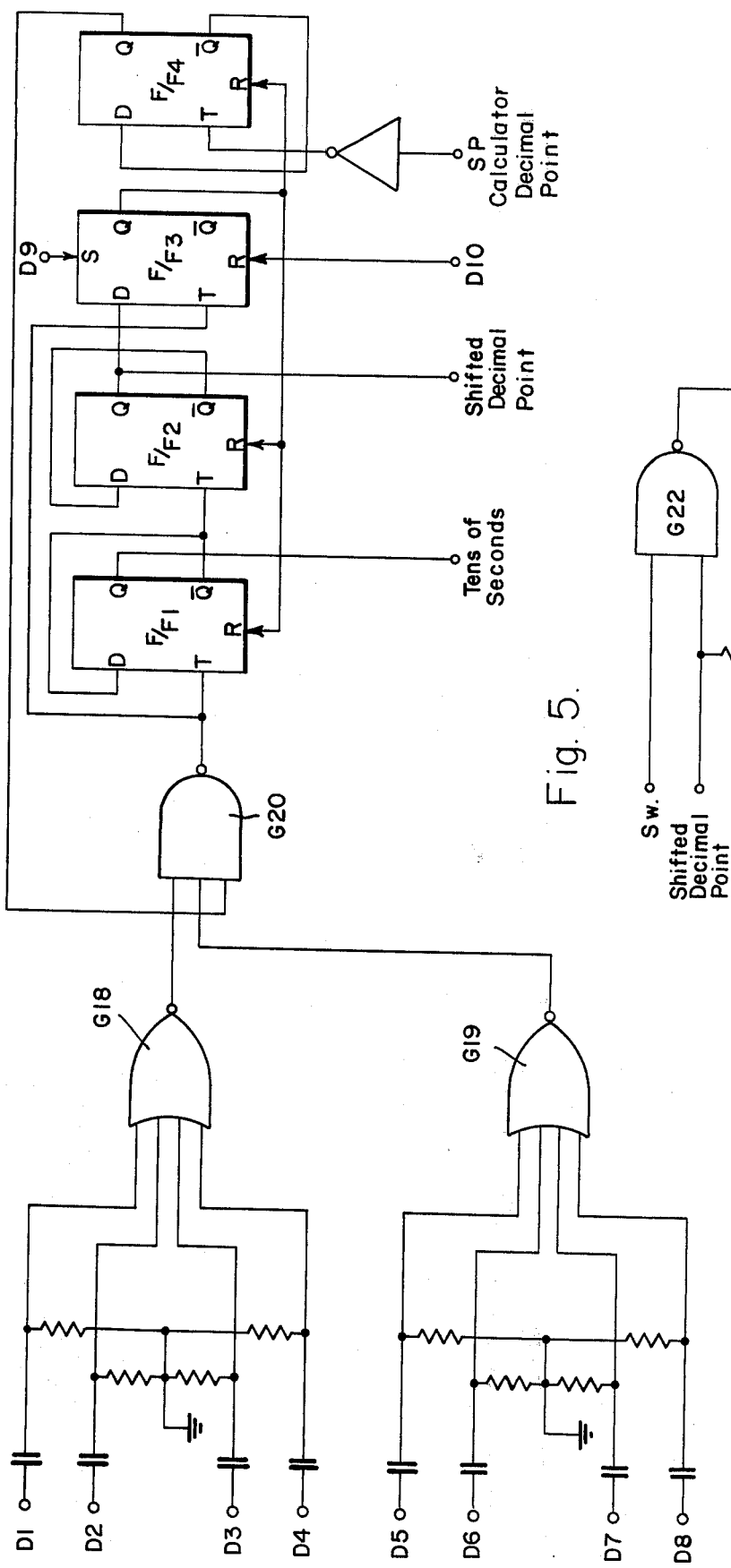
FIG. 5 and 6 show the circuitry for the proper placement of the decimal point in the display.

Calculator circuits can be obtained wherein the least significant digit of any given number is represented by the right-most display digit (D1 in FIG. 2, right hand entry), or alternatively wherein the most significant digit is represented by the left-most numerical display digit (D8 in FIG. 2, left hand entry). In the case of a left hand entry circuit, the "seconds" digits information can be located in any of the display digits D1 through D8. Also with either a left-hand or right-hand entry circuit, the counting function may be initiated from a number obtained as a result of an arithmetic calculation. The number may include a decimal point. Consequently, additional circuitry must be incorporated into the system to allow identification of the two "seconds" digits under all operating conditions. This function is accomplished by the circuit shown in FIG. 5. Output pulses from all calculator digit control signals D1 through D8 are differentiated by resistor-capacitor networks, and the resulting spike waveforms are summed by gates G18, G19, and G20. The calculator decimal point output signal SP can be used to define the units seconds digit since it occurs during display of the least significant whole number digit. The trailing edge of the decimal point output signal SP is used to set a flip flop FF4 which then allows the digit position spikes to appear at the output of gate G20 and drive a chain of three flip-flops FF1, FF2, and FF3. The tens-of-seconds digit is indicated when the first flip-flop FF1 in the chain changes state, which change was caused by the first spike after the calculator decimal point activation. The second spike causes the first flip-flop in the chain to revert to its original state and the second flip-flop to indicate the position of the units-minutes digit. This digit is useful for introducing a decimal point between the minutes and seconds digits for display clarity. The third pulse (spike) causes the third flip-flop in the chain to change state, which resets the other three flip-flops and stops further activity in the circuit until D10 is activated and resets flip-flop FF3 in the chain. If the units seconds digit is located at D6, D7 or D8, a third spike will not appear and flip-flop FF3 will not be set and flip-flops FF1, FF2, and FF4 will never be reset. In order to take care of this situation, flip-flop FF3 is set by digit control signal D9 and the cycle can continue. Then the cycle is repeated.

Figure 6:
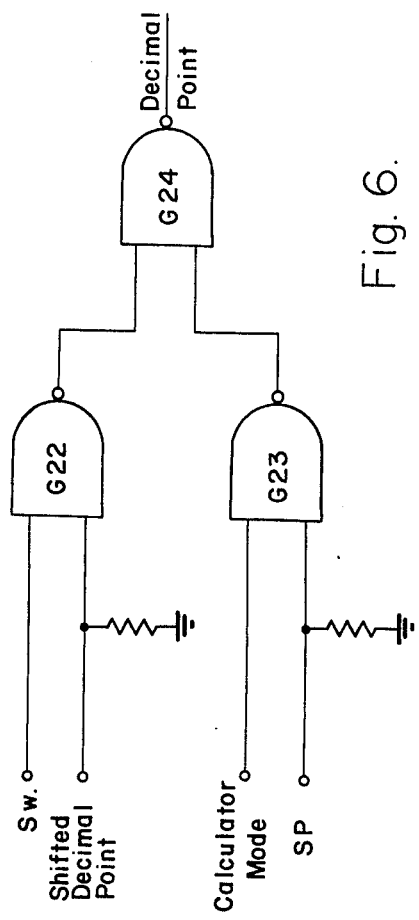

The circuit which places the decimal point between the minutes and seconds digits is shown in FIG. 6. When the system is in the calculator mode, gate G23 is activated by the SP signal which appears unchanged at the output of gate G24. When the system is in the modulo 60 mode, however, gate G22 is activated and the shifted decimal point signal appears at the output of G24.

What is claimed is:
1. Navigation instrument comprising:
   means for displaying a navigation chart;
   a calculator circuit for performing arithmetic calculations, said calculator circuit including an output register;
   display means for visually displaying a number in the output register of said calculator means;
   means for manually entering data from the navigation chart to said calculator means;
   means for manually entering operation signals to said calculator means;
   an enabling signal, said enabling signal being manually activated;
   clock means for providing a signal once each second; and
   circuit means for entering data and operation signals to said calculator circuit in response to said enabling signal and the signal from said clock means, to add one to the number in the output register of said calculator circuit each second.

2. A navigation instrument as claimed in claim 1, which further comprises:
   means for signaling when the two least significant whole number digits of the number in the output register of said calculator circuit are 59 and the number is positive and when the two least significant whole number digits of the number in the output register of said calculator circuit are 00 and the number is negative; and
   means, responsive to said means for signaling, for adding 41 to the number in the output register of said calculator circuit.

3. A navigation instrument as claimed in claim 2, which further comprises:

means for displaying a decimal point to the left of the two least significant whole number digits in the output register of said calculator means.

4. A navigation instrument comprising:

means for visually displaying a navigation chart;

a calculator circuit for performing arithmetic calculations, said calculator circuit including an output register;

a visual display for displaying a number in the output register of said calculator circuit;

means for manually entering data from the navigation chart to said calculator circuit;

means for manually entering operation signals to said calculator circuit;

clock means for providing a signal once each second;

an enabling signal from a manual enabling switch;

circuit means, responding to said enabling signal and the signal from said clock means, for entering a data digit 1 signal and a plus/equal operation signal to said calculator circuit once each second, whereby one is added to the least significant whole number digit in the output register of said calculator circuit each second;

means for signaling when the two least significant whole number digits of the number in the output register of said calculator circuit are 59 and the number is positive and when the two least significant whole number digits of the number in the output register of said calculator circuit are 00 and the number is negative; and means, responsive to said means for signaling, for entering a data digit 4 signal prior to the operation of said circuit means whereby 41 is added to the number in the output register of said calculator circuit each second.

5. A navigation instrument as claimed in claim 4, which further comprises:

means for displaying a decimal point to the left of the two least significant whole number digits in the output register of said calculator circuit.

6. A navigation instrument comprising:

a calculator circuit for performing arithmetic calculations, said calculator circuit including an output register;

a visual display for displaying a number in the output register of said calculator circuit;

means for manually entering data signals and operation signals to said calculator circuit;

clock means for providing a signal once each second;

an enabling signal from a manual enabling switch;

circuit means, responding to said enabling signal and the signal from said clock means, for entering a data digit 1 signal and a plus/equal operation signal to said calculator circuit once each second, whereby one is added to the least significant whole number digit in the output register of said calculator circuit each second;

means for signaling when the two least significant whole number digits of the number in the output register of said calculator circuit are 59 and the number is positive and when the two least significant whole number digits of the number in the output register of said calculator circuit are 00 and the number is negative; and means, responsive to said means for signaling, for entering a data digit 4 signal prior to the operation of said circuit means whereby 41 is added to the number in the output register of said calculator circuit each second.

7. A navigation instrument as claimed in claim 6, which further comprises:

means for displaying a decimal point to the left of the two least significant whole number digits in the output register of said calculator circuit.

* * * * *